Sept. 4, 1934.   E. B. CUSHMAN   1,972,680
AGRICULTURAL APPARATUS
Original Filed Nov. 17, 1930
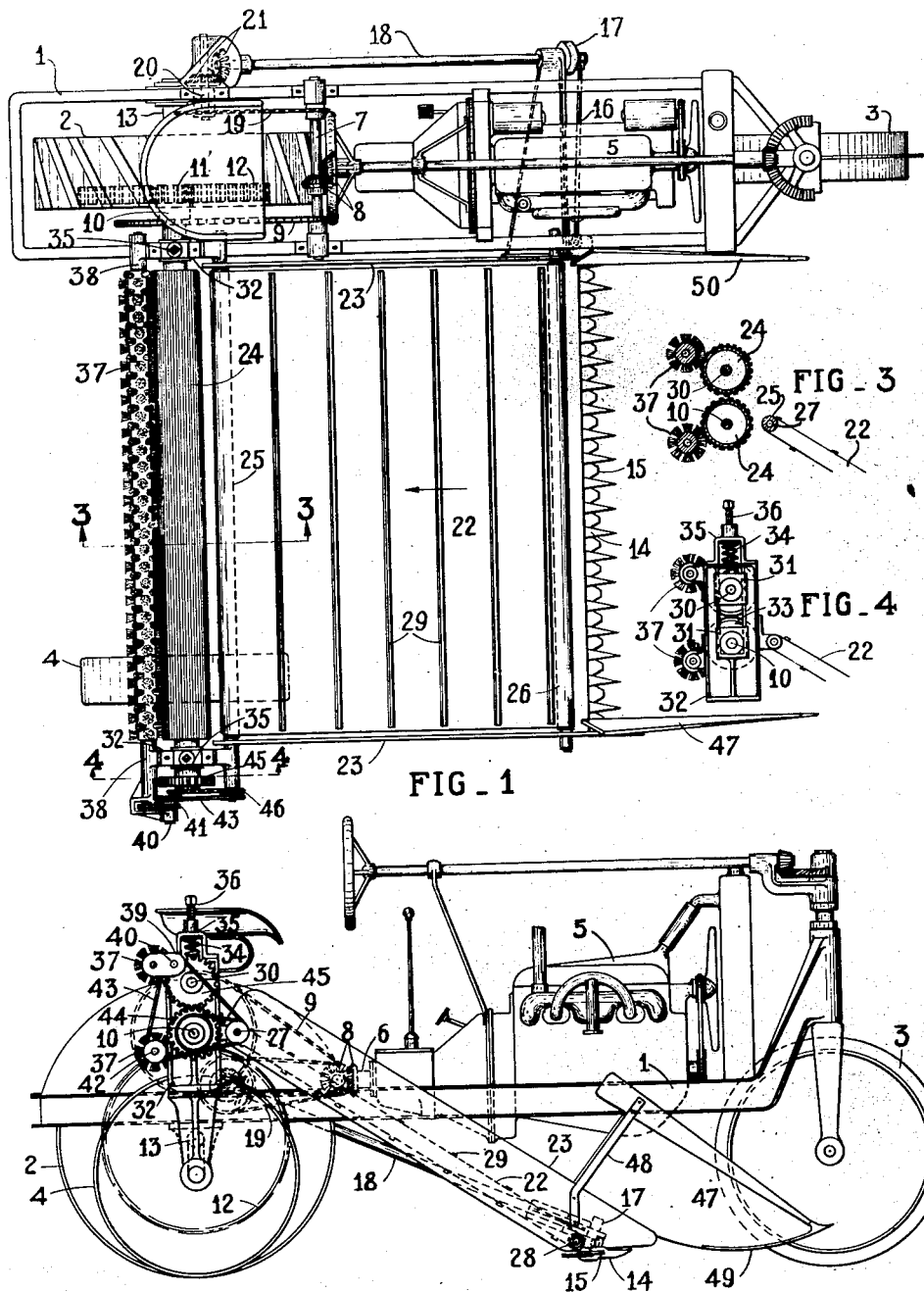
FIG_1
FIG_3
FIG_4
FIG_2
INVENTOR.
Everett. B. Cushman.
BY Philip A. Minnis
ATTORNEY.

Patented Sept. 4, 1934

1,972,680

UNITED STATES PATENT OFFICE 1,972,680

AGRICULTURAL APPARATUS

Everett B. Cushman, San Jose, Calif., assignor to Food Machinery Corporation, San Jose, Calif., a corporation of Delaware Application November 17, 1930, Serial No. 496,360
Renewed December 11, 1933

3 Claims. (Cl. 56—1)

This invention relates to the curing of alfalfa and has particular reference to an apparatus adapted to carry out the method disclosed in my copending application, Serial No. 227,866, filed October 21, 1927.

As explained in said application in the curing of alfalfa by prior methods, much loss has resulted by reason of time necessary to effect the curing. The common method, heretofore, has been to mow or cut the alfalfa by any suitable means, such as a mower, and then allowed to dry in the swathe for a day or two, according to conditions and then rake it into windrows and allow it to dry another day or two whereupon it is usually raked into large piles or cocks for final drying, which takes from 4 to 7 days. It will be understood, of course, that these periods are illustrative as average and may vary under different atmospheric conditions and varying conditions of the alfalfa. Under the very best of conditions, however, several days are necessary to effect satisfactory curing and since in most parts of the United States rains are frequent occurrences, there is a considerable chance for the alfalfa to get wet, and even if it does not rain during this period, it is usually dampened to a more or less extent by dew or fog. The dampening accelerates bleaching which reduces its value for animal food. It has been found that bleaching not only renders the alfalfa less palatable to stock by reason of the consequent loss of color and aroma, but greatly decreases the food value. Tests have shown that the vitamin A contained is reduced in proportion to the length of time of exposure. Even if the alfalfa escapes dampening due to rain, dew or fog, there is still a considerable amount of bleaching by reason of the protracted exposure to the sun with results above pointed out, so that the curing process necessarily entails great waste.

In the practice of my method, the length of time necessary to cure the alfalfa is reduced to a minimum so that I am enabled to avoid bleaching and thus preserve the food value as well as the color and aroma. This is accomplished by cutting the alfalfa as usual, when fresh and green and immediately crushing it so as to break down the cells of the plant and expel the juices to the outer surfaces. The crushing accomplishes several purposes. The first result is to spread the expelled juice, which is a bright green in color, over all parts of the plants, thus dyeing all parts uniformly and imparting the same fresh green color to the stems as to the leaves. As pointed out above, this result is desirable as the animals are apt to reject those portions such as the stems which are less green than the leaves, thus wasting much valuable feed.

Another result is that when the crushed alfalfa is now exposed to the sun, the juice expelled from the plant is quickly evaporated and drying is greatly accelerated. In actual practice it has been found that under ordinary conditions the alfalfa loses as high as 50% of its moisture in from one to three hours after crushing and 85% in approximately six hours thereafter. The alfalfa can therefore be raked into windrows almost immediately after cutting and crushing where it will be completely cured in from 20 to 48 hours without the necessity of cocking. Since the time necessary for curing is so short, the chances of it getting wet are greatly reduced and bleaching is almost altogether prevented. The alfalfa cured by my method thus retains both its color and aroma and maintains its high vitamine A content. If artificial dehydration is preferred instead of sun curing it will be noted that my method will effect great saving if used in connection therewith, due to the rapid initial loss of moisture.

A most important characteristic of alfalfa treated by my method is that the leaves do not shatter off as badly as when cured by known methods. Whereas heretofore the comparatively thick stems dried more slowly than the thinner leaves, thus allowing many of the leaves to fall off, under my process, where the entire plant is crushed, drying is more uniform and consequently the loss of many leaves is avoided. This materially increases the value of the product as the leaves have the greatest food value.

Among the other advantageous results obtained by curing alfalfa by my method above described may be mentioned that the necessity for cocking is avoided and from 20 to 30% more alfalfa can be packed into a bale of given size than of alfalfa cured by previously known methods thus effecting further economies. Moreover, whereas much difficulty is experienced by ordinary alfalfa heating up when baled or when put in the mow or stack, particularly if it is not fully cured, it has been found that crushed alfalfa has little tendency in this direction, and consequently less care and attention is required.

In order to enable me to practice my method as described above, I have invented the new and novel apparatus herein disclosed, which broadly comprises a combined mowing and crushing machine adapted to mow the alfalfa and immediately thereafter to pass the cut plants through a set of specially constructed crushing rollers where they are crushed so as to liberate their juices. The apparatus illustrated is provided with a power plant which not only serves to operate the mowing and crushing units but also to propel the entire machine over the ground. It will be understood, however, that the power plant may be dispensed with and the apparatus used as a trailer for connection to any suitable towing means such as a tractor or the like.

It is therefore the principal object of the present invention to construct an apparatus adapted to carry out my novel method above described.

More specifically, it is an object to construct such an apparatus which shall be provided with means for cutting alfalfa hay, together with means for receiving the cut hay and crushing it sufficiently to expel the juices contained therein.

Another object is to construct and apparatus for the purposes described, having means for crushing cut alfalfa hay, which crushing means shall be adapted to crush varying quantities of the hay and without clogging.

With these and other objects in view, as will hereinafter become apparent as the description proceeds in connection with the accompanying drawing, the invention comprises certain novel constructions, combinations and arrangements of parts hereinafter illustrated, described and claimed.

In the accompanying drawing, Fig. 1 is a plan view of the apparatus embodying my invention.

Fig. 2 is a side elevation of the apparatus shown in Fig. 1.

Fig. 3 is a sectional view taken along the line 3—3 of Fig. 1 illustrating the corrugated rubber crushing rollers and the cleaning brushes therefor.

Fig. 4 is a sectional view along the line 4—4 of Fig. 1, showing the manner in which the crushing rolls are mounted.

The apparatus illustrated comprises a frame 1, provided with a rear traction wheel 2 and a front wheel 3, while a third wheel 4 supports the mowing and crushing units disposed to one side of the frame. Power for propelling the apparatus is supplied to the rear wheel 2 from the engine 5 by means of the transmission shaft 6 which drives the jack shaft 7 through the bevel gears 8. The chain 9 passing over suitable sprockets serves to drive the shaft 10, which carries the pinion 11, cooperating with the gear 12 keyed to the axle 13.

For cutting the alfalfa, I have illustrated a well known type of mower comprising a cutter bar 14 and toothed cutting knife 15 mounted in cooperative relationship therewith. The knife 15 is adapted to be reciprocated by the connecting rod 16, driven by the crank 17, mounted on the end of the shaft 18, which is operated from the jack shaft 7 by the chain 19, shaft 20, and bevel gears 21. As the alfalfa is cut, it is received by the endless conveyor belt 22, operating between the side rails 23 and elevated to the crushing rollers 24, between which it is crushed and then discharged upon the ground to the rear of the machine. The conveyor belt is mounted upon suitable rollers 25 and 26, mounted upon shafts 27 and 28 and is provided with flights 29 which assist in elevating the alfalfa to the crushing rollers.

The crushing rollers 24 are provided with shafts 10 and 30, journaled in suitable bearings 31 carried by standards 32. In order to accommodate varying quantities or thicknesses of alfalfa, it is necessary for one of the rollers to be yieldably mounted and to this end the upper roller is mounted so as to yield in a vertical direction as required. The bearings 31 are adapted to be received in slots 33 formed in the standards 32 and the lower bearings may be fixedly secured to the standard, or not, as desired, preferably they are fixed. The upper bearings are slidably mounted in the slots 33 and heavy coil springs 34 bear against their upper surfaces so as to cause the upper roller to be constantly urged downwardly against the lower roller. The upper ends of the springs abut against retaining members 35 and are provided with adjustable screws 36, by which the degree of compression of the springs can be varied to suit varying requirements. Either one or both of the rollers are preferably formed of, or covered with rubber as it has been found that metal rollers have a tendency to chew up the alfalfa. In the construction illustrated, both rollers are shown as being covered with rubber, but this construction is optional and applicant's invention in its broader aspects is not to be construed as limited thereto, or to any particular material. It is important that the rubber be harder than the alfalfa stems, as if softer rubber is used, the stems may pass between the rollers without being crushed, due to the resilience of the soft rubber. A medium hard rubber is desirable which is hard enough to insure crushing of the stems and yet not hard enough to cause laceration as in the case of metal rollers. It will also be noted that the rollers are corrugated which construction has been found to aid materially the passage of alfalfa through the rollers and thus prevent sticking and speeds up the operation.

Unless some means is provided for cleaning the crushing rollers, they will soon become sticky from the alfalfa juice and pieces of stems, leaves, dirt and other debris will adhere to them, causing them to operate unsatisfactorily. To prevent this there is provided a rotary brush 37 for each crushing roller, which is mounted in brushing relationship therewith and acts to brush off any particles adhering to them and thus keep them clean. The brushes are journaled in bearings 38, formed in brackets projecting from the standards 32, and the upper brush is driven from the pulley 39 through the shaft 40 and gears 41. A similar pulley 42 is carried on the lower brush shaft and a third pulley on the outer end of the shaft 27 and a flexible belt 43 passes around the three pulleys whereby the brushes are driven from the shaft 27 in the same direction as the brushing rollers. The upper crushing roller is driven from the lower crushing roller through the intermeshing gears 44 and 45 on the shafts 10 and 30, the gear teeth being deep enough to remain in mesh when the rolls are separated by the alfalfa being crushed, and the shaft 27 is driven by the chain 46.

The tops of the growing alfalfa are usually somewhat tangled and in order to separate the tangled tops at the outer edge of the mower, so that none of the cut plants will be dragged off the conveyor by reason of their entanglement with other plants, the divider shoe 47 is provided, which is secured by the bracket 48 and the brace 49. A similar shoe or fender 50 is carried at the opposite end of the cutter bar.

It is believed that the operation will be apparent from the foregoing description. As the machine advances, the alfalfa is cut by the mower and received by the conveyor belt 22 which elevates it to the crushing rollers 24, which receives the cut plants and crushes them so as to expel the juice therefrom, whereupon the crushed plants are ejected from the rollers to the rear of the machine for drying. As the crushing rollers revolve the rotary brushes 37 sweep them clean of all debris that may stick to them so that clogging is prevented and continuous operation assured.

Although for purposes of illustration, I have disclosed only one embodiment of my invention, it will be understood that many changes and modifications may be made without departing from the spirit of said invention, and it is to be understood that I regard myself as entitled to all such changes and modifications as fall within the scope of the claims hereto appended.

Having now described my invention and in what manner the same may be used and what I claim as new and desire to secure by Letters Patent:

1. In an apparatus for harvesting alfalfa and the like, a mower, means for expressing juice from the mowed material comprising a plurality of presser rollers disposed in parallel relation and provided with resilient surfaces of a hardness sufficient to express juice from the mowed material passing between the rollers without breaking apart the stems of said material, and means for receiving the mowed material from the mower and delivering it to the pressing rollers.

2. In an apparatus for harvesting alfalfa and the like, a mower, means for expressing juice from the mowed material comprising a pair of presser rollers disposed in parallel relation and provided with hard rubber surfaces of a hardness sufficient to express juice from the mowed material passing between the rollers without breaking apart the stems of said material, and means for receiving the mowed material from the mower and delivering it to the pressing rollers.

3. In an apparatus for harvesting alfalfa and the like, a mower, a pair of compression rollers disposed in adjacent parallel relation to compress the mowed plants therebetween, one of said rollers having a resilient surface of sufficient hardness to crush the plants passing between the rollers but of such resilience as not to break apart the stems of said plants, and means for receiving the mowed material from the mower and feeding it between the compression rollers.

EVERETT B. CUSHMAN.